United States Patent [19]

Gibson et al.

[11] Patent Number: 5,348,696

[45] Date of Patent: * Sep. 20, 1994

[54] INTEGRATED LUNAR MATERIALS MANUFACTURING PROCESS

[75] Inventors: Michael A. Gibson; Christian W. Knudsen, both of Houston, Tex.

[73] Assignee: Carbotek Inc., Houston, Tex.

[*] Notice: The portion of the term of this patent subsequent to Mar. 20, 2010 has been disclaimed.

[21] Appl. No.: 479,419

[22] Filed: Feb. 12, 1990

Related U.S. Application Data

[62] Division of Ser. No. 118,414, Nov. 6, 1987, Pat. No. 4,948,477.

[51] Int. Cl.$^5$ .................... C04B 35/64; C04B 35/46
[52] U.S. Cl. .......................... 264/65; 501/1; 501/134; 423/80
[58] Field of Search ............. 423/80; 501/1, 134; 252/478; 264/65, 66

[56] References Cited

U.S. PATENT DOCUMENTS

| | | | |
|---|---|---|---|
| 279,159 | 6/1883 | Henderson | 501/108 |
| 785,841 | 3/1905 | Turner | 501/108 |
| 2,875,107 | 2/1959 | Daiger | 423/80 |
| 2,954,278 | 9/1960 | Gaskin et al. | 423/80 |
| 3,660,029 | 5/1972 | Naguib | 423/80 |
| 3,961,940 | 6/1976 | Fukushima et al. | 423/80 |
| 4,085,190 | 4/1978 | Shiah | 423/80 |
| 4,495,123 | 1/1985 | Hunold et al. | 501/96 |
| 4,948,477 | 8/1990 | Gibson et al. | 204/129 |

*Primary Examiner*—Anthony Green
*Attorney, Agent, or Firm*—Neal J. Mosely

[57] ABSTRACT

A feed material which is a mixture of chemically reduced lunar ilmenite and lunar agglutinates having a particle size in the range of 20–200 microns produced by hydrogen reduction in a fine particulate state is compacted into a shape and sintered to produce structural, radiation shielding construction blocks or bricks.

2 Claims, 7 Drawing Sheets

INTEGRATED LUNAR MATERIALS MANUFACTURING PROCESS

This application is a division of copending application Ser. No. 118,414, filed Nov. 6, 1987, now U.S. Pat. No 4,948,477.

BACKGROUND OF THE INVENTION

1. Field of the Invention

This invention relates to a new and improved integrated lunar materials manufacturing process and associated apparatus.

2. Brief Description of the Prior Art

The incentive for oxygen production on the moon is primarily the increased payload thereby made possible for other space missions which then do not have to carry all their propellant and life-support oxygen from earth. Also, oxygen produced on the moon requires much less launch energy and propellants to transport it to another space use, such as a space station, than oxygen launched from the deep gravity well of earth. An oxygen plant is therefore a key facility in a manned lunar base or colony.

Methods considered by applicants for lunar oxygen production use either: 1) reduction of iron-oxygen compounds with hydrogen or other reducing gases such as carbon monoxide or methane; 2) molten-phase electrolysis of the whole range of minerals found in surface-mined lunar regolith, or 3) direct thermal reduction of the regolith minerals. See Kesterke, D.C., U.S. Bureau of Mines Report of Investigations 7587, Reno, Nev. 1971.

The first method requires beneficiation and mineral separation steps upstream of the reduction reactor and chemical or physical techniques downstream to extract the oxygen and regenerate the reducing agents. The second and third methods do not require beneficiation but require much higher reduction process temperatures. Electrolysis requires handling and containing a corrosive, molten-salt bath and regeneration of earth-derived reagents or fluxes from the spent solids after electrolysis. See Weissbart, J. and Ruka, R., J. Electrochem. Soc. 109, No. 8, pp.723–726, August, 1962. Direct thermal reduction also poses high-temperature container corrosion problems, and, because of thermodynamic equilibrium limitations, requires that the oxygen be produced from the solids at low pressures. This invention addresses only the first method, namely hydrogen-reduction of naturally-occurring lunar iron-oxygen compounds.

A large base of prior-art technology is relevant to this method, namely those patents which teach various techniques for fluidized-bed reduction of iron ores and other steps in our process, such as electric heating and gas phase electrolysis.

Jukkola U.S. Pat. No. 3,210,180 discloses a process of temperature control for fluidized beds used in reduction of iron ores.

Tomizawa U.S. Pat. No. 4,224,056 discloses a process of reduction of iron ores with carbon in fluidized beds.

Bessant U.S. Pat No. 3,637,368 discloses a process of reduction of iron ores in fluidized beds by coating the ore particles with carbon and then gasifying the carbon at low pressures.

Whaley U.S. Pat No. 3,295,956 discloses a process of refining iron ore particles by gas reduction in a fluidized bed reactor.

Mayer et al U.S. Pat No. 3,346,365; Shipley U.S. Pat. No. 2,752,234; and Meissner U.S. Pat No. 3,031,293 disclose processes of reduction of iron ores with carbon monoxide or hydrogen in fluidized beds.

Colombo et al U.S. Pat. No. 3,554,733 discloses a process of converting ferrous sulfate to sulfuric acid and iron oxide which is refined by reduction in a fluidized bed reactor.

Campbell U.S. Pat. No. 3,591,363 discloses a process of reduction of iron ores with hydrocarbons in radiant heated fluidized beds.

Colombo et al U.S. Pat No. 3,649,245; Viviani et al U.S. Pat No. 3,758,293; Wittman et al U.S. Pat No. 3,167,419; and Schytil et al U.S. Pat No. 2,893,839 disclose processes of refining pyrite ore by reduction in a fluidized bed reactor.

Gray U.S. Pat No. 3,374,087 discloses a process of refining particulate iron ore containing a substantial amount of gangue by reduction in a succession of fluidized bed reactors.

Volk et al U.S. Pat No. 3, 347,659 discloses a process of refining particulate iron ore by reduction in a fluidized bed reactor followed by grinding and screening.

Peras U.S. Pat. No. 3,148,572 discloses a process of refining hematite by reduction in a fluidized bed reactor to produce pure powdered iron.

Gorling U.S. Pat No. 3,984,229 discloses a process of reduction of hematite or magnetite with gases in fluidized beds followed by agglomeration of the iron particles.

Old et al U.S. Pat No. 2,894,831 discloses a process of refining iron ore by reduction in a fluidized bed reactor followed by melting in an electric furnace.

Hoffert U.S. Pat No. 3,761,244 discloses a process of reduction of iron ore in successive stages in fluidized beds.

Knepper U.S. Pat No. 3,896,560 discloses a two-stage fluidized bed reactor with nozzle tuyeres for reduction of iron ores.

Matsubara et al U.S. Pat No. 3,928,021 discloses a process of reduction of iron ores in fluidized beds with utilization of thermal energy produced in the process.

Malgarini et al U.S. Pat No. 4,082,545 discloses a process of reduction of iron ore particles with gases in fluidized beds followed by formation of iron sponge.

Hoffert U.S. Pat No. 3,864,465 discloses a process of reduction of iron ore in fluidized beds with recovery and purification of hydrogen.

Prymak U.S. Pat. No. 4,509,103 discusses the dissipation of RF energy in ceramic capacitors but does not apply the heating technique to gases.

Kitagawa U.S. Pat. No. 4,439,929 discloses dielectric drying of a honeycomb ceramic but has no dielectric dissipation in the ceramic, only in the occluded moisture.

Blum et al U.S. Pat. No. 3,993,653 discloses a solid state electrolyte used in decomposing water and details of cell designs.

Williams et al U.S. Pat. No. 3,464,861 and Hegedus et al U.S. Pat. No. 4,396,480 disclose a solid state electrolyte used in a fuel cell.

Morrow U.S. Pat. No. 4,087,976 discloses a solid state electrolyte used in decomposing water.

Brothers al U.S. Pat. No. 4,659,435 discloses a solid state electrolyte used in decomposing water with integral heating.

Stucki U.S. Pat No. 4,427,504 discloses a solid state electrolyte used in a process for production of nitric oxide.

This invention builds on this substantial prior art by adapting it to the special lunar requirements of: 1) minimal consumption of earth-derived materials and ease of making up those unavoidably consumed; 2) extreme importance of thermal efficiency as the key to minimizing power generator launched weight; 3) complete absence of atmospheric air and water for cooling or for use in the beneficiation step and complete absence of any type of hydrocarbon fuels; 4) reduced gravity about 1/6 that of earth; 5) extreme emphasis on reliability with minimum manned attention.

SUMMARY OF THE INVENTION

One of the objects of this invention is to provide a new and improved integrated lunar materials manufacturing process and related apparatus.

Another object of this invention is to provide a new and improved integrated lunar materials manufacturing process and related apparatus for production of oxygen and usable by-products.

Another object of this invention is to provide a new and improved integrated lunar materials manufacturing process and related apparatus for production of oxygen and usable by-products using lunar minerals as feed and a minimum of earth-imported, process materials.

Another object of this invention is to provide a new and improved integrated lunar materials manufacturing process and related apparatus for production of oxygen and usable by-products using hydrogen-reducible minerals, ilmenite and lunar agglutinates occurring in numerous, explored locations mixed with other minerals in the pulverized surface layer of lunar soil known as regolith.

Another object of this invention is to provide a new and improved integrated lunar materials manufacturing process and related apparatus for production of oxygen and usable by-products using hydrogen-reducible minerals, ilmenite and lunar agglutinates by surface mining of lunar soil known as regolith, transporting the regolith to the process site, and separating most of the silicates and other irreducible minerals from the ilmenite and lunar agglutinates to produce an enriched feed for the process.

Another object of this invention is to provide a new and improved integrated lunar materials manufacturing process and related apparatus for production of oxygen and usable by-products using an enriched feed of the hydrogen-reducible minerals, ilmenite and lunar agglutinates having a particle size of 20–200 microns in a fluidized bed reactor fluidized by hydrogen at 700°–1,200° C. to produce water which is electrolyzed to oxygen for storage and use and hydrogen which is recycled.

Another object of this invention is to provide a new and improved integrated lunar materials manufacturing process and related apparatus for production of oxygen and usable by-products using an enriched feed of the hydrogen-reducible minerals, ilmenite and lunar agglutinates having a particle size of 20–200 microns in a fluidized bed reactor fluidized by hydrogen at 700°–1,200° C. to produce water which is electrolyzed in the gas phase at the reactor temperature.

Another object of this invention is to provide a new and improved integrated lunar materials manufacturing process and related apparatus for production of oxygen and usable by-products using enriched feed of the hydrogen-reducible minerals, ilmenite and lunar agglutinates having a particle size of 20–200 microns in a fluidized bed reactor fluidized by hydrogen heated by an RF dielectric heater to 700°–1,200° C. to produce water which is electrolyzed in the gas phase at the reactor temperature.

Another object of this invention is to provide a new and improved integrated lunar materials manufacturing process and related apparatus for production of oxygen and usable by-products using enriched feed of the hydrogen-reducible minerals, ilmenite and lunar agglutinates having a particle size of 20–200 microns in a fluidized bed reactor fluidized by hydrogen heated by an RF dielectric heater to 700°–1,200° C. to produce water which is electrolyzed in the gas phase at the reactor temperature.

Other objects and features of the invention will become apparent from time to time throughout the specification and claims as hereinafter related.

The above noted objects and other objects of the invention are accomplished by a manufacturing plant and process for production of oxygen on the moon which uses lunar minerals as feed and a minimum of earth-imported, process materials. Lunar feed stocks are hydrogen-reducible minerals, ilmenite and lunar agglutinates occurring in numerous, explored locations mixed with other minerals in the pulverized surface layer Of lunar soil known as regolith. Ilmenite ($FeTiO_3$) and agglutinates contain ferrous ($Fe^{+2}$) iron reducible by hydrogen to yield $H_2O$ and metallic Fe at about 700°–1,200° C. The $H_2O$ is electrolyzed in gas phase to yield $H_2$ for recycle and $O_2$ for storage and use.

Hydrogen losses to lunar vacuum are minimized, with no net hydrogen (or any other earth-derived reagent) consumption except for small leaks. Feed minerals are surface-mined by front shovels and transported in trucks to the processing area. The machines are manned or robotic. Ilmenite and agglutinates occur mixed with silicate minerals which are not hydrogen-reducible at 700°–1,200° C. and consequently are separated and concentrated before feeding to the oxygen generation process.

Solids rejected from the separation step and reduced solids from the oxygen process are returned to the mine area. The plant is powered by nuclear or solar power generators. Vapor-phase water electrolysis, a staged, counter-current, fluidized bed reduction reactor and a novel, radio-frequency-driven ceramic gas heater are used to improve thermal efficiency.

DESCRIPTION OF THE PREFERRED EMBODIMENTS

Methods considered by applicants for lunar oxygen production would use either: 1) reduction of iron-oxygen compounds with hydrogen or other reducing gases such as carbon monoxide or methane; 2) molten-phase electrolysis of the whole range of minerals found in surface-mined lunar regolith, or 3) direct thermal reduction of the regolith minerals. The first method requires beneficiation and mineral separation steps upstream of the reduction reactor and chemical or physical techniques downstream to extract the oxygen and regenerate the reducing agents. The second and third methods do not require beneficiation but require much higher reduction process temperatures. Electrolysis requires handling and containing a corrosive, molten-salt bath and regeneration of earth-derived reagents or fluxes from the spent solids after electrolysis. Direct thermal reduction also poses high-temperature container corrosion problems, and, because of thermodynamic equilibrium limitations, requires that the oxygen be produced from the solids at low pressures. This invention addresses only the first method, namely hydrogen-reduction of naturally-occurring lunar iron-oxygen compounds.

This invention builds on the prior art by adapting it to the special lunar requirements of: 1) minimal consumption of earth-derived materials and ease of making up those unavoidably consumed; 2) extreme importance of thermal efficiency as the key to minimizing power generator launched weight; 3) complete absence of atmospheric air and water for cooling or for use in the beneficiation Step and complete absence of any type of hydrocarbon fuels; 4) reduced gravity about 1/6 that of earth; 5) extreme emphasis on reliability with minimum manned attention.

Figure 1:
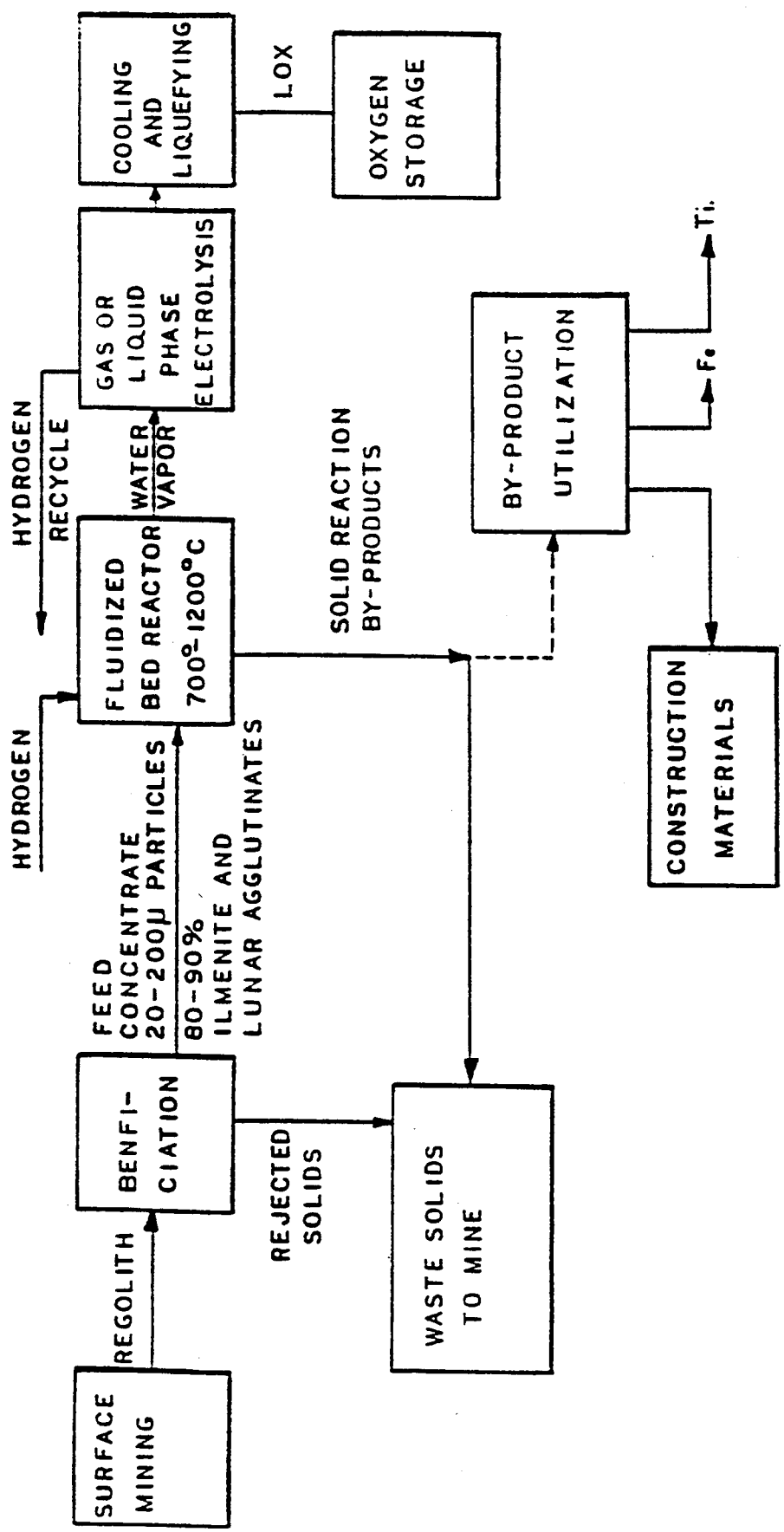
FIG. 1 is a flow diagram of an integrated lunar materials manufacturing process and apparatus in accordance with this invention.

Referring to the drawings, it is seen that a block diagram or flow diagram of the overall process sequence appears in FIG. 1. The overall process will be described generally referring to FIG. 1, and then individual processing steps and equipment are described in more detail with subsequent Figures.

Mining activity for oxygen production in support of a permanent lunar base presumes the surface mining of lunar regolith (soil) in an area of high-titanium basaltic rock in lunar mare regions. This fine comminuted rock is readily removed by simple excavation methods. The particular soil used in mining and processing considerations is Apollo mare soil 71061; particle sizes, relative weight fractions, and soil composition are described in references. This soil contains approximately 10 wt. % ilmenite, with the mineral predominating in the smaller fractions. The 45 to 90 micron cut was estimated to contain about half of the total sample ilmenite or to be approximately 20 wt. %. Alternatively, basaltic rock below the regolith may be mined, crushed and ground, and classified to the desired particle sized for use in the process.

Ilmenite recovery and concentration during beneficiation determines the size of the mining activity together with the reactor feed rate. Assuming beneficiation and reaction plant service factors of 75%, but mining operations only during the lunar day with allowance for start-up/shut-down time limiting mining service factor to 35%, mining rates of approximately 40 metric tons per hour are needed (about 25 cubic meters or 30 cubic yards) for a plant producing 1,000 metric tons of oxygen annually.

The concept of bucket-wheel excavators (BWE's) and movable conveyors had initial appeal, given the excellent state of the art for these devices and the availability of small BWE machines suitable to this relatively low mining rate with service weight of about 30 metric tons. However, consideration of the necessary movable conveyors associated with a BWE and the dozers necessary to move the conveyors, the stacking and reclaiming machine operations necessary near the beneficiation plant for both mined material and beneficiation plant tailings/reactor residue, and the front-end loaders necessary to tie these larger piles to the beneficiation plant makes it clear that operations larger by an order of magnitude or so would be necessary to justify a BWE mining scheme. Otherwise, the mining rate-to-equipment weight ratio would be much too low.

Subsequent inquiries pointed to an apparently quite suitable excavation device, the front shovel. Available machines are generally too large for the desired mining rate, but could be reduced in size and electrified to an approximate service weight of thirty metric tons. These devices are similar to the generally smaller back-hoe excavators, but have the advantage of maintaining a smooth floor while working receding walls in a gradually expanding shallow pit mine. They are capable of digging below floor level in contrast to front-end loaders and can develop the ramps necessary for open-pit mining. Depth of a lunar pit mine is best at two meters or so.

Front shovels are designed to exert considerable forward force (crowd) in digging the shovel into the mine wall. Similarly, they have considerable break-out force to extract the shovel with a full load of material. Further, front shovels readily clear and load trucks which can dump near the beneficiation plant. Based on terrestrial experience, these trucks may carry considerably more than their weight so that a 15 metric ton truck might carry 25 metric tons of material or so. In this event, it is reasonable that operations could be conducted with three trucks initially (one spare); a fourth truck would be added later when the distance from mining wall to beneficiation plant justifies it. Two front-end loaders are necessary to feed the beneficiation plant and to reload tailings/residue onto the trucks for placement in the mined area. These weigh about 10 metric tons each. Total machine weight for this system is roughly 95 metric tons.

The mining machinery had to be substantially reduced in weight because of the transportation cost of placing these machines on the lunar surface. Use of light, high-strength alloys or composite materials for machinery structural components in the low lunar gravity field reduces weights considerably relative to terrestrial experience. However, machinery bearing stresses and vibrational considerations, for example during such mining operations as crowding and break-out for the front shovel, limit weight savings in the interest of high system reliability. Potential track slipping of the front shovel, particularly during crowd, is dependent on soil characteristics, machinery weight and track design; however, this can be remedied with lunar soil or rock ballast.

Automation of the mining equipment was not studied during the design of this process and apparatus; however the front shovel and truck operations appear to be candidates; this would save three to four personnel per shift if this were possible. Given around the clock mining operations during lunar day with the equivalent of three shifts, automation would save approximately a dozen people.

Figure 2:
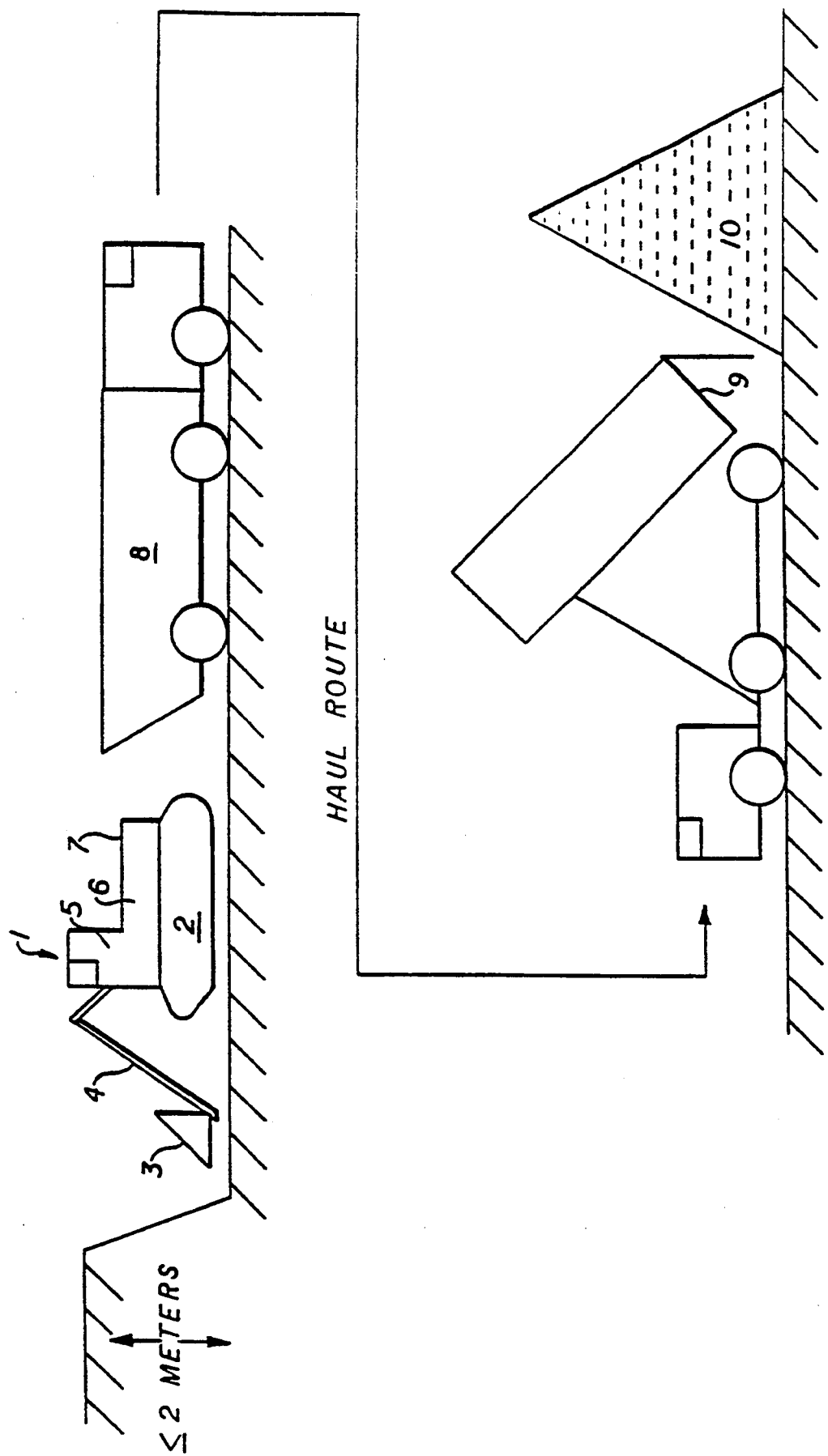
FIG. 2 is a schematic diagram of the mining and transport of the feed material for an integrated lunar materials manufacturing process and apparatus of FIG. 1.

In the flow diagram of FIG. 1, and in the schematic diagram of FIG. 2, it is seen that the lunar regolith is surface-mined using a combination of front shovel and haul truck machines. Mining depths are about two meters or less for two reasons: first, there is almost no data now available on regolith compositions or particle size distributions at greater depths; second, this eliminates the need for dangerous, steep-sloped climbs with the mining machines into or out of a mining area.

Two types of iron-oxygen-bearing minerals, ilmenite ($FeTiO_3$) and $Fe^{+2}$-bearing, glassy agglutinates, are the primary feed stocks, and the mining site is chosen primarily based on their abundance in the regolith. The maximum ilmenite contents discovered in the Apollo program samples was about 5 volume %; agglutinates ranged up to as high as 50 volume %.

The remaining minerals are mostly silicates which behave as inert diluents in the hydrogen-reduction. Consequently, as shown, the mined regolith is transported in haul trucks to the beneficiation and processing area where the next steps of mineral separations based on size and physical properties afford a sized (20-200 microns) feed concentrate of 80-90 wt % reactive material. Haul trucks return to the mining area with the rejected solids from beneficiation.

Feed concentrate enters the reactor through a bucket elevator/lock hopper/screw feeder combination and contacts recirculating, pressurized hydrogen in a stack of three fluidized beds. The hydrogen is heated by RF-dielectric heating to 700°-1,200° C. The hydrogen may be transported from earth or may be recovered and concentrated from the trace amounts found in the regolith.

Reduction occurs in the center bed to yield a $H_2/H_2O$ gas mixture which is then electrolyzed in the gas phase at the temperature of the reactor using a solid-state electrolyte device. The desired product, oxygen gas, is produced at one boundary surface of the solid electrolyte and proceeds to cooling, liquefaction and storage.

The process relies heavily on recycling and utilization of by-products and thermal efficiency is maintained throughout. Hydrogen is regenerated at the other boundary surface of the electrolyte and recycled to the process. Spent, reacted solids are removed through a sequenced lock hopper/vacuum pump arrangement to minimize hydrogen leakage.

Haul truck return trips again return spent solids to the mine. Since reactive oxygen is only 5-10 wt % of the feed concentrate, the spent solids are a large stream which must be efficiently handled. Alternatively, by-product solids from the fluidized bed reactors may be utilized in the production of sintered block construction materials or may be subjected to further processing for production of iron and/or titanium metals.

In FIG. 2, there is shown a more detailed schematic view of the lunar regolith mining equipment. A front loading shovel 1 operates on tracks 2 and comprises a large bucket 3 supported on a maneuverable boom 4 which is, in turn, attached to a frame including closed cab 5 and motor 6 and ballast 7 compartments.

This is a well-known type of mining machinery in use on earth and is adapted for lunar use by substitution of an electric motor for a diesel engine as the prime mover and a lighter weight overall design made possible by the reduced lunar gravity. Electric power is provided by an attached, armored power cable with a reel for control of slack cable or by wireless transmission of power, or by a set of rechargeable batteries or on-board fuel cells. While it is theoretically possible to power shovel 1 by solar energy, it is unlikely that this vehicle could carry sufficient solar generating panels to supply its own power and retain its maneuverability and lifting capability. On the other hand, generation of solar power at a fixed location may be the source for either a cable connection or wireless transmission of power to the vehicle.

A manned front shovel is used because it is maneuverable and adaptable to unplanned variations in mine terrain or ore grade which a fixed system such as a conveyor or even a movable conveyor cannot. It can maintain a relatively flat mine floor and obtain its required traction by use of lunar soil ballast material. The combination of tracks and ballast provide crowding force not attainable in a machine with tires. A space-suited operator is required as the cab enclosure is, for simplicity, not pressurized but provides protection only against dust and spills.

Haul truck 8, on the other hand, does operate on tires and, because of the greater distances over which it moves, is powered with a set of rechargeable batteries or fuel cells optionally augmented with solar panels (not shown) on the truck. As shown, its bed is designed to tilt and dump through the back panel 9 on to the feedstock pile 10 in the beneficiation area. The tilt and back-dump design is chosen over a mechanically simpler belly-dump design to avoid having to elevate the truck over the storage pile or excavate the pile area.

Figure 3:
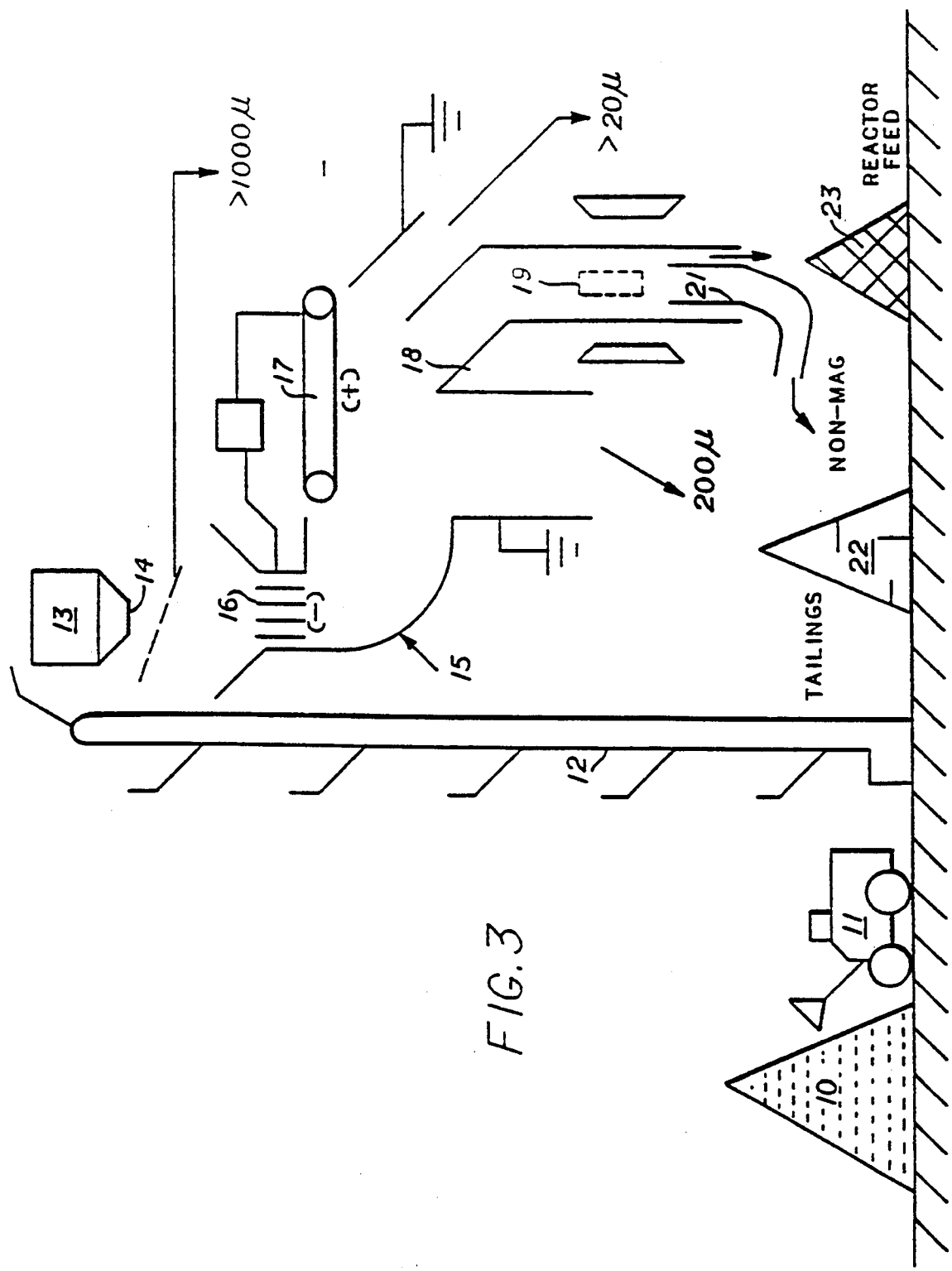
FIG. 3 is a schematic diagram of the beneficiation of the feed material for an integrated lunar materials manufacturing process and apparatus of FIG. 1.

A schematic flow diagram of the beneficiation process is shown in FIG. 3. The reduction process employs fluidized beds described more fully below. Consequently, the feed concentrate particles resulting from beneficiation process steps should be in the size range from about 20 to about 200 microns. The as-mined regolith has been found to contain very few particles larger than 1,000 microns but a substantial number of particles smaller than 20 microns. Consequently, no grinding is required, but the feed concentrate must be heart-cut from the over- and under-size fractions.

In FIG. 3, a front-end loader 11 transfers regolith from storage pile 10 to bucket elevator 12 which, in turn, feeds hopper 13. Screen 14 fed by gravity is sized to remove only the very largest oversize particles, those whose diameter is 1,000 microns or larger. This is because even terrestrial screens have both low throughput and low separation efficiency at mesh sizes much below 1,000 microns, and both these parameters are further reduced by the lowered lunar gravity and high fines content of as-mined regolith.

The under-1,000 micron particles fall by gravity into an electrostatic size separation device 15. The design of this device has been taken from conceptual and experimental prototype studies at NASA-JSC. See Williams, R. J., McKay, D. S., Giles, D., and Bunch, T. E., "Mining and Beneficiation of Lunar Ores," pp. 275–288, NASA Publication SP-428, 1979. The device requires no fluid media and uses opposed electrostatic and gravitational forces to cause falling, electrified particles trajectories to diverge according to differences in size, density and electrical properties such as dielectric constant, conductivity and charging mechanism.

As shown, particles fall through a plurality of charging electrodes 16 into a region of superposed gravitational and electrostatic fields. The electrostatic field results primarily from the positively charged belt 17 and secondarily from the negative charging electrodes 16.

The attractive electrostatic force between the belt and the negatively charged particles depends on the particles' areas (square of diameter) and their dielectric constant and conductivity. The gravitational force depends on the particles' volume (cube of diameter) and their density. The difference between these two forces is a strong function of particle size modified somewhat by differences in the other physical properties.

This results in the trajectory separations shown through the grounded splitter 18. The smallest particles are most affected by the electrostatic forces and are directed to the under-20 micron channel in the splitter 18. The desired feed fraction, 20–200 microns, is directed to the center channel while particles larger than 200 microns are the least diverted and fall into the lowest channel.

The 20–200 micron size fraction now consists of a mixture of ilmenite, agglutinates and silicates. It continues as shown into a second electrostatic or magnetic separation device. The ilmenite and agglutinates have substantially higher electrical conductivity and magnetic susceptibility than the silicates, so separations can be made based on either of these properties. Unit 19 is a permanent-magnet-based separator designed by Eriez Magnetics for this type of separation. The feed mixture falls by gravity into a vertical tube surrounded by a quadrupole arrangement of four permanent magnets. These are designed to produce an approximately uniform radial field gradient with zero field at the tube center and increasing field toward the walls. At the bottom, a concentric tube 21 serves as a splitter. The magnetic fraction, which will contain the ilmenite and agglutinates is drawn toward the walls while the silicate tailings fall into the center tube 21. This process increases the reactive components, i.e., the ilmenite and lunar agglutinates, to about 80–90% of the feed.

Solids rejected from the various beneficiation steps, e.g., under- and over-sized particles, and the separated silicate fraction, are taken by conveyor belt to tailings pile 22. Here they are joined by spent solids from the reduction reactor and transferred by front-end loader 11 into haul trucks 8 for return to the mine area. Spent solids from the reduction reactor may alternatively be used in production of sintered brick construction materials or may be subjected to further refining to produce iron and/or titanium metals.

Figure 4:
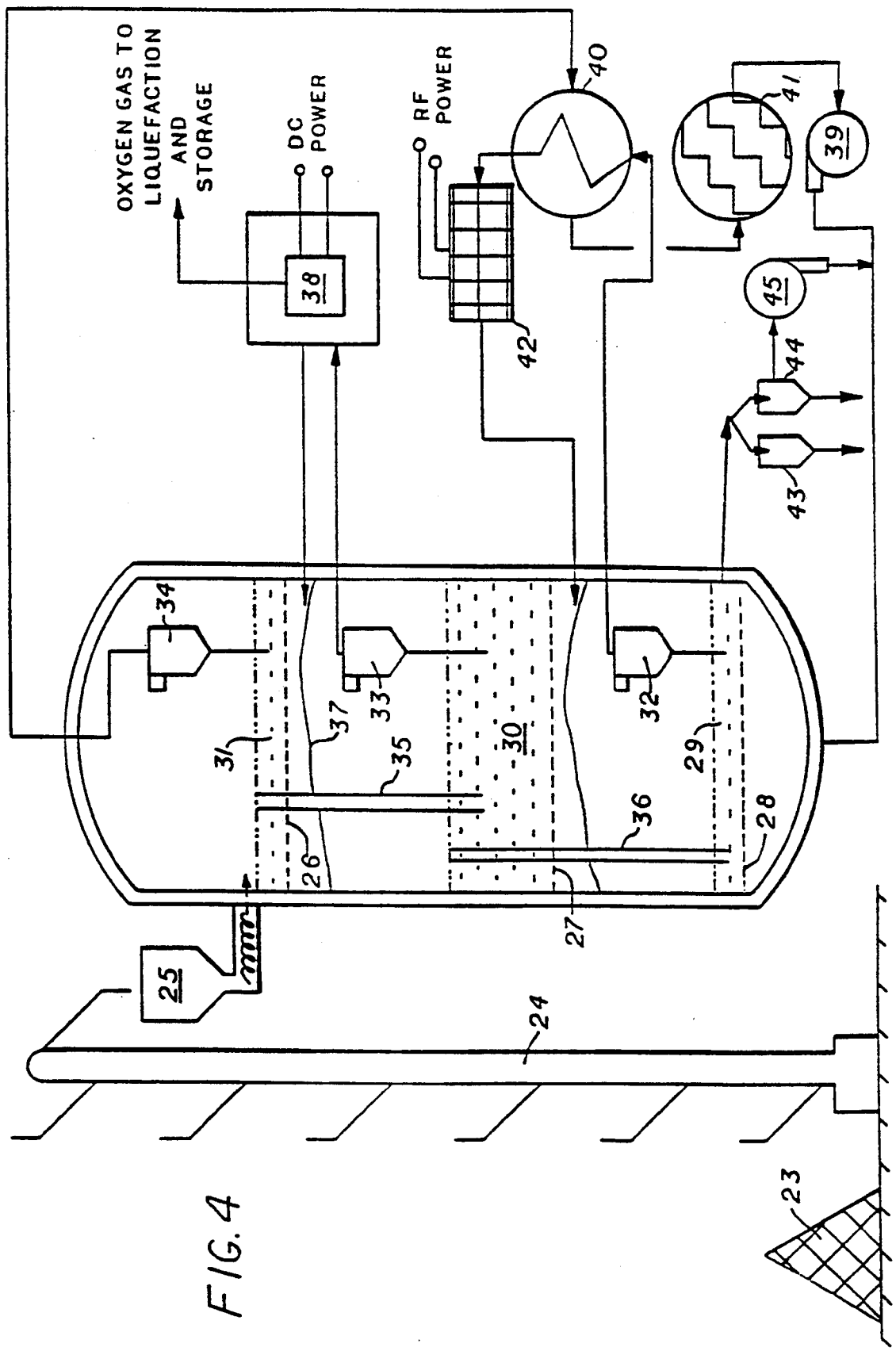
FIG. 4 is a schematic diagram of the hydrogen reduction and oxygen production steps in the integrated lunar materials manufacturing process and apparatus of FIG. 1.
Figure 5:
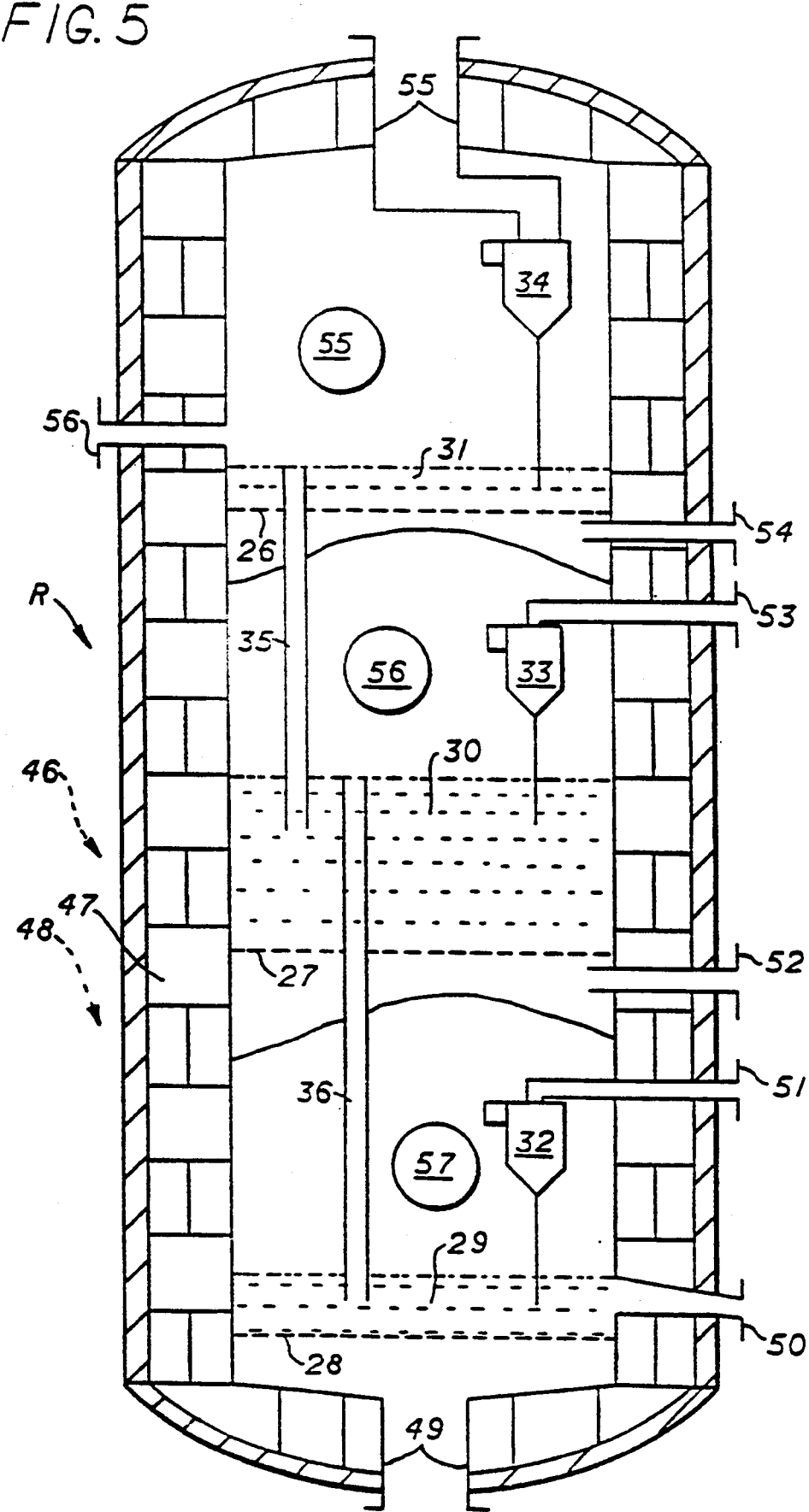
FIG. 5 is a view in longitudinal central section of the reactor used in the hydrogen reduction of lunar materials in the integrated lunar materials manufacturing process and apparatus of FIG. 1.

In FIG. 4, there is shown a more complete flow diagram of the hydrogen reduction process. Bucket elevator 24 lifts feed concentrate particles from storage pile 23 to lock hopper/screw feeder assembly 25. The solids are fed into the top bed of reactor R which consists of three fluidized beds stacked vertically within the same cylindrical shell. FIG. 5 shows a detailed drawing of the reactor and is described below. Each bed contains a gas distributor 26, 27 and 28, a bed of fluidized solids 29, 30 and 31 and cyclones 32, 33 and 34. Solids move by gravity from top to bottom bed through downcomers 35 and 36. Hydrogen gas is introduced at the bottom and moves countercurrently upward through the distributors and cyclones at velocities sufficient to fluidize the solids in each of the three beds.

The hydrogen reduction chemical reactions occur in the center bed. The top and bottom beds accomplish heat exchange between the once-through solids and the circulating hydrogen. The reactions occurring are, for ilmenite,

$$FeTiO_3 + H_2 \rightleftharpoons Fe + TiO_2 + H_2O$$

and, for the agglutinates,

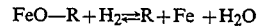

$$FeO-R + H_2 \rightleftharpoons R + Fe + H_2O$$

where R represents the solid matrix containing the ferrous iron-oxygen compound.

The low-conversion equilibrium constraint of the basic ilmenite reduction reaction

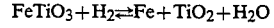

$$FeTiO_3 + H_2 \rightleftharpoons Fe + TiO_2 + H_2O$$

means that beyond the equilibrium conversion limit of about 7–15% for the 900°–1,100° C. temperature range, respectively, no more reaction occurs. This leads to the decision to convert water vapor formed to product oxygen and recycle hydrogen and to design the reaction bed so that conversion stays below or just reaches equilibrium at the top of an upflowing fluidized bed. Additional bed height above that needed to reach this conversion represents washed reactor volume.

Laboratory measurements have shown that minimal reaction rates are obtained at center-bed temperatures of at least 700° C. and that more practical rates require at least 800° C. Reaction rates increase moderately with temperature, so that temperatures up to approximately 1,200° C. are effective. Above about 1,200° C., the solid particles begin to stick together which, in practice, would cause the fluidized bed to slump and fluidization to cease as well as make the particles hard to transport between beds and out of the reactor. Therefore, the range of operable center-bed temperatures is approximately 700° C.–1,200° C.

In this temperature range the above reactions are reversible, and this imposes a limit on per pass hydrogen conversion. For ilmenite, the equilibrium conversion limit ranges from 3 to 19% over 700° C.–1,200° C.; for the agglutinates, the limit is approximated by that for wustite which is 40–45% over the same temperature range. Efficient operation of the reactor therefore requires that $H_2O$ be continuously separated and electrolyzed from the $H_2/H_2O$ product mixture leaving the center bed and the $H_2$ be recycled. As shown in FIG. 4, baffle 37 above the center bed forces this product mixture to flow through cyclone 33 and into the electrolyzer 38. Recycle H₂ returns from the electrolyzer and preheats the incoming cold solids in the top bed.

The top and bottom bed temperatures are determined by heat balance once the center bed temperature and conversion are specified. Recycle H₂ is circulated by blower 39 which overcomes the small pressure drops in the three fluidized beds and the piping. Because of the limited conversion, the recycle H₂ stream flow and heat capacity are large relative to the solids. The top bed does not cool the H₂ enough to allow reliable blower operation, so a heat exchanger 40 and radiative cooler 41 are located upstream of the blower in the recycle loop. Exchanger 40 reduces makeup heat requirements by preheating upstream of the reaction bed. Cooler 41 rejects low-level heat to reach a temperature safe for the blower.

The bottom fluidized bed salvages heat that would otherwise be wasted in the spent solids before they leave the reactor. It and exchanger 40 both preheat the H₂. Makeup heat must then be added in RF dielectric heater 42 to bring the H₂ up to reaction temperature, supply the endothermic heat of reaction and overcome heat losses from the whole reactor vessel.

The reactor pressure is determined by a balance of several factors including reactor vessel and piping weight and dimensions, blower power and effect of pressure on reaction rates. Laboratory measurements have shown that rates are proportional to hydrogen pressure up to at least 150 psia. Practical reactor pressures are expected to be from 30 to 300 psia.

Spent solids leave the reactor through the pair of lock hoppers 43 and 44. These hoppers have solenoid valves and instrumentation, so that one hopper can be filling with solids while the other is being evacuated by vacuum pump 45. The vacuum pump serves to remove interstitial gas from solids pores and interstices between solids and return this gas to the recycle H₂ as shown. Once evacuated, a hopper is dumped by switching the solenoid valves to isolate the hopper and permitting the spent solids to flow out by gravity. This prevents loss of the interstitial gas.

Spent solids are returned to the mine area as previously noted. However, these solids, being rich in iron and titanium, may be subjected to conventional refining processes for recovery of pure iron and/or titanium metals. Also, a portion of these solids may be further used to produce construction and/or radiation shielding materials by sintering and pressing into useful shapes such as bricks. These solids leave the reactor system much hotter than asmined regolith, so this energy may also be used as preheat if the solids are further heated prior to sintering and pressing.

The spent solids, as a result of the beneficiation and reduction steps, are considerably enriched in higher atomic number elements, i.e., iron and titanium, compared to the lunar soil mix which is mostly silicon, oxygen, calcium, aluminum and magnesium. Consequently, the spent solids are more effective for radiation shielding than comparable weights or volumes of unprocessed lunar soil. Furthermore, the presence of glassy material from the agglutinates results in stronger sintered products since it acts as a binder during sintering and pressing. The formation of construction materials from by-product solids will be described more fully below.

Referring to FIG. 5, the reactor vessel R comprises a stainless steel shell 46 with an internal refractory liner 47. Liner 47 insulates metal shell 46 from the high process temperature, so the strength of the metal does not have to be de-rated. To further protect the metal shell 46 in the lunar environment, its outside surface is coated with a high radiation emissivity coating 48. This improves heat rejection efficiency since the only means of rejecting heat from the outer surface is by radiation.

Refractory liner 47 may be constructed from any of several well-known firebrick formulations, however this makes it quite heavy and greatly increase the weight which must be launched from earth. Alternatives which reduce launched weight are to replace the firebrick with space shuttle heat shield tiles which are excellent lightweight insulators or use lunar soil as the raw material for the lining which would eliminate the need to launch these materials.

Six penetrations of the refractory liner are required by the process: nozzle 49, the recycle gas inlet; nozzle 50, the spent solids outlet; nozzle 51, the outlet for gas feeding the electrolyzer; nozzle 52, the gas return from electrolysis; nozzle 53, the recycle gas outlet; nozzle 54, the feed solids inlet. In addition, manways 55, 56 and 57 allow a space-suited man to enter and perform internal maintenance.

Gas distributors 26, 27 and 28 at the base of the respective beds 29, 30 and 31 may be any of several designs including fritted disks, simple perforated plates or perforated plates with attachments such as bubble caps to improve gas distribution and prevent solids weeping through the distributors. The solids downcomers 35 and 36 are vertical tubes extending from the free surface of one bed to a point below the free surface of the bed below. The cross-sectional area and height of the downcomer pipe controls the solids throughput and is sized to account for reduced lunar gravity. The top of each downcomer sets the level of the fluidized solids above the distributor plates.

Figure 6:
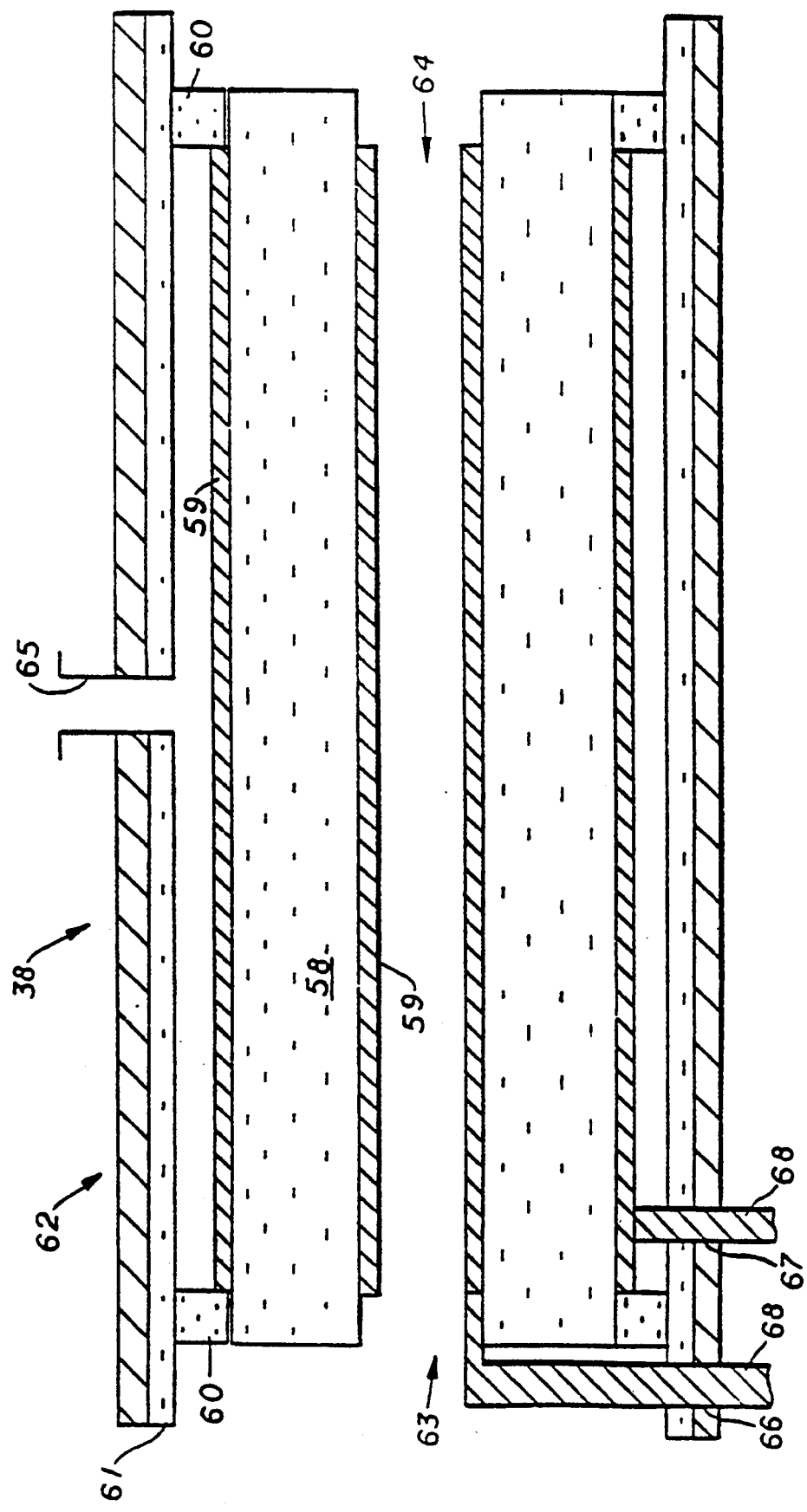
FIG. 6 is a view in longitudinal central section of the electrolyzer used in electrolysis of water produced by hydrogen reduction of lunar materials in the integrated lunar materials manufacturing process and apparatus of FIG. 1.

In FIG. 6, electrolyzer 38 has a solid-state electrolyte 58, preferably composed of a calcium oxide- or yttrium oxide- stabilized zirconia ceramic fabricated by sintering or slipcasting into the perforated cylindrical shape shown. The outer and inner longitudinal surfaces are coated with a thin layer of platinum 59 which serves as the electrodes. The electrolyte cylinder 58 is mounted inside two disk-shaped, impermeable ceramic baffles 60 using refractory cement 61.

This assembly is, in turn, centered inside a refractory-lined metal pressure shell 62. The same stabilized zirconia material is used for the baffle and refractory liner in order to have the thermal expansion coefficient be the same for all components. This prevents leakage and/or cracking due to differential growth of one component when heated to operating temperature. Alternatively, this can be achieved by matching the solid electrolyte's coefficient with other, possibly cheaper ceramic compositions.

Pressure shell 62 has a feed inlet 63 at one end for the H₂/H₂O mixture from the reactor, an outlet 64 for H₂ return at the other end and a circumferential outlet 65 for the product oxygen. Additionally, there are electrically insulated penetrations 66 and 67 to admit the direct current for electrolysis. As shown, these are connected to the platinum coatings with platinum wire 68. Another, less expensive type of conductor might be substituted for the platinum wire provided it has the necessary high temperature capability and oxidation resistance.

The electrolyte dimensions are determined by testing to provide sufficient residence time and interfacial area to accomplish complete conversion of feed $H_2O$ to $H_2$ and $O_2$ at the anticipated flow rates and other conditions. It is recognized that other electrolyte designs such as those having multiple longitudinal holes or different electrode materials (e.g., palladium, iridium, rhodium) may be substituted for the design in FIG. 6.

Figure 7:
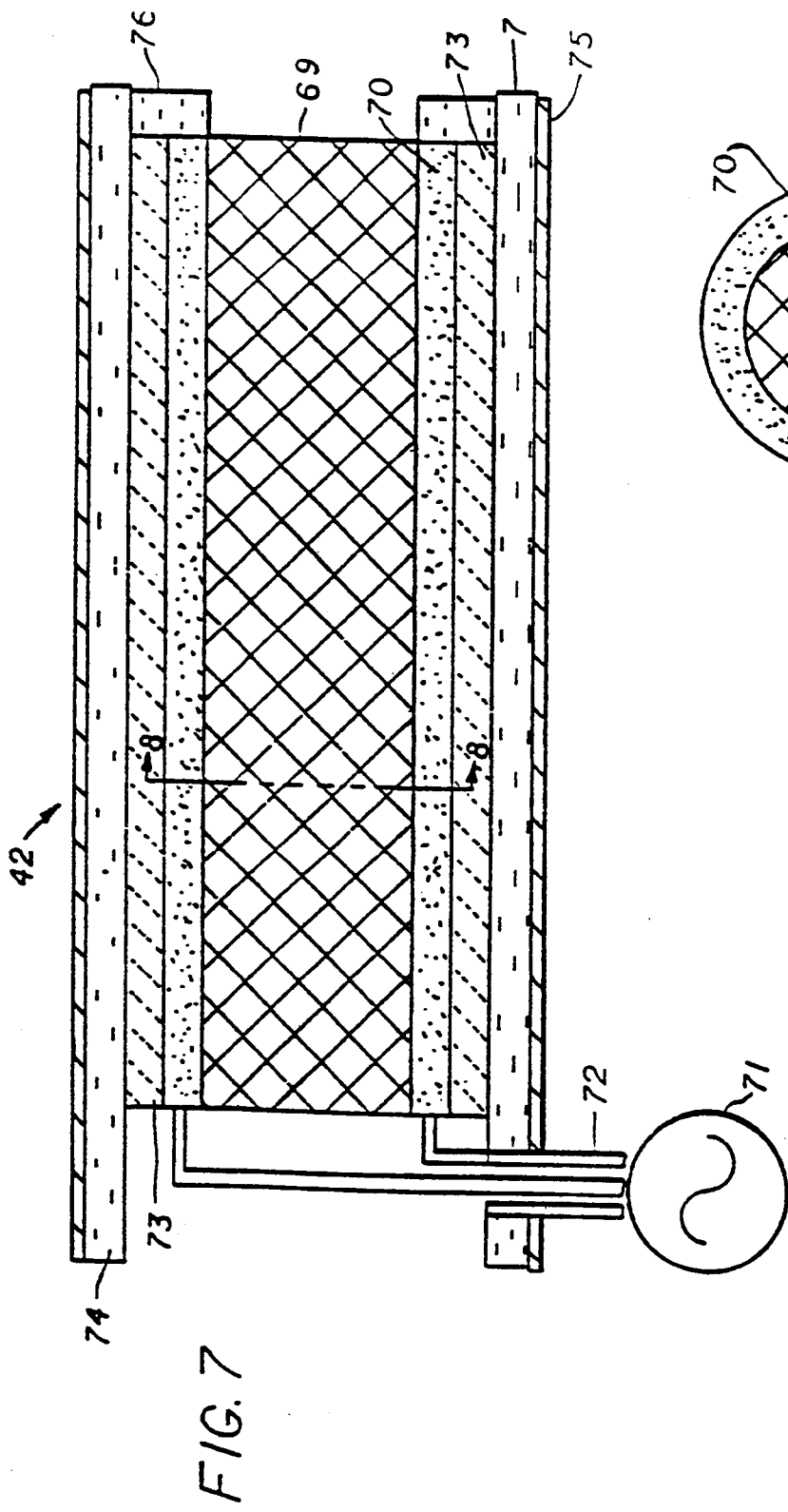
FIG. 7 is a view in longitudinal central section of the radio-frequency dielectric gas heater for heating the hydrogen used in the reduction of lunar materials in the integrated lunar materials manufacturing process and apparatus of FIG. 1.
Figure 8:
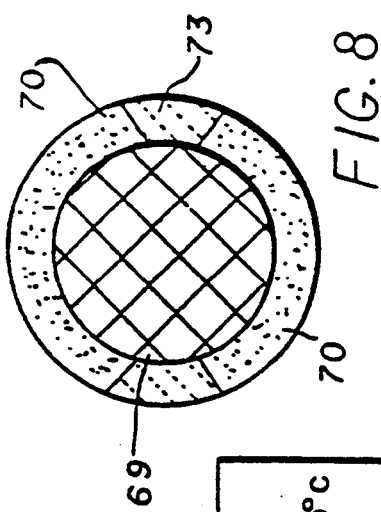
FIG. 8 is a sectional view taken on the section line 8—8 of FIG. 7.

In FIG. 7, the radio-frequency-driven dielectric gas heater 42 is shown in more detail. Heater 42 has, as a key component, a cylindrical ceramic honeycomb 69 in the center. The honeycomb consists of many, small parallel channels (1-2 mm square) separated by thin, ceramic walls. These walls are the heat transfer surfaces, so the honeycomb geometry packs a large amount of heat transfer surface into a small volume. Solid-to-gas heat transfer is very efficient and the temperature of gas and adjacent solid in the honeycomb remain quite close up to very high heat transfer rates.

Ceramic honeycomb 69 absorbs power from a radio-frequency field imposed by two half-cylinder graphite electrodes 70 surrounding it. Electrodes 70 are, in turn, connected to the external RF source 71 through the coaxial type connectors 72 penetrating the shell and insulation.

A layer of flexible blanket type insulation 73 surrounds and insulates graphite electrodes 70 both electrically and thermally. This is finally enclosed within the refractory-lined metal pressure shell 74. Gas, i.e., hydrogen, to be heated flows through inlet nozzle 75 and into the ceramic honeycomb 69. The honeycomb is continuously heated by high frequency dielectric dissipation of power in the ceramic which transfers the heat efficiently to the gas through the large, compact interfacial area provided by the honeycomb cell walls. Gas heater 42 thus provides the desirable features of high heat transfer area per unit volume, excellent corrosion resistance and high temperature capability in the absence of hydrocarbon fuels. Hot gas returns to the reactor through nozzle 76.

Gas heater 42 has at least three potential advantages especially for NASA in a space manufacturing application: 1) the ceramic heat transfer medium tolerates much higher temperatures than, for example, a resistively-heated metallic device such as a "Calrod." (Metal heaters usually have very short lives when used to heat gases to 1,000° C. or more.); 2) the ceramic is much more tolerant of reactive or corrosive materials in the gas such as hydrogen, sulfur compounds, etc., especially at high temperatures; and 3) much higher heat transfer rate per unit volume than other types of solid to gas heaters. This last advantage occurs because solid-to-gas heat transfer coefficients are usually poor relative to liquids. This heater overcomes this in two ways: a) by using dielectric heating, power is dissipated uniformly throughout the solid volume and temperature gradients due to low solid thermal conductivity are avoided; b) the honeycomb geometry provides a high density of heat transfer area. The combination of uniformly high temperatures (high driving force) and large area multiplies the intrinsically low coefficient to produce high heat transfer rates per unit of honeycomb volume or, in other words, a compact gas heater. Heat transfer rates of $10^6$ Btu/hr-ft$^3$ are obtainable, at least one order of magnitude above conventional devices such as furnaces or shell-and-tube heat exchangers.

It has been found that for several ceramics of interest the power factor, measured at a number of radio frequencies, increases strongly with temperature. This means that the higher the operating temperature of the honeycomb, the more effective it is as an RF power absorber which is a desirable feature.

The maximum usable field strength, is set by the dielectric strength of the ceramic. A few published room temperature values of this for various ceramics rankle from 16,000 to 94,000 volts/cm. Extrapolating somewhat lower temperature ceramics data to 1,000° C. shows that the power factor has 1,000° C. values of 1-10. With a field strength of 10,000 volts/inch=3937 volts/cm, much less than the dielectric strengths above, and a conservative estimate of power factor=1.0, a heater operated at 50 MHz absorbs and transfers $10.3 \times 10^6$ watts/m3 which is roughly 106 Btu/hr-ft$^3$. As noted, these are impressive per unit volume heat transfer rates.

Figure 9:
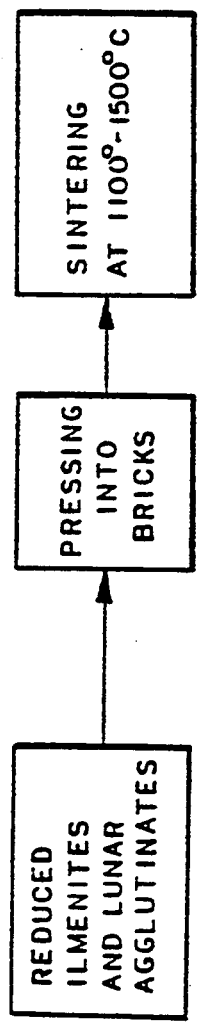
FIG. 9 is a flow diagram of production of construction materials as a by-product from the integrated lunar materials manufacturing process and apparatus of FIG. 1.

In FIG. 9, there is shown a schematic flow diagram of the process for forming construction materials from the by-product solids from the hydrogen reduction of the enriched or beneficiated lunar feed.

Lunar bases require use of considerable native material for construction or shielding of human shelters and equipment enclosures. Transporting all materials from earth is prohibitively expensive. Also, lunar-derived shielding material is very important for human space activity in high earth orbit (e.g., geostationary orbit) and for protecting defense-related equipment. The transportation savings result, of course, from the moon's reduced gravity and the consequently much lower energy required to reach earth orbit from the moon.

It was recognized that simple sintering techniques applied to various lunar materials might result in acceptable construction/shielding materials without the use of water-based cements. It has been demonstrated experimentally that for a very ordinary material, coal ash, whose composition resembled unprocessed lunar dust, acceptable compressive strengths for building bricks could be reached. Gartner's technique was pressure-sintering at 900°-1000° C. and 1,000-3,000 psi; strengths were enhanced if a small amount of glassy flux were added. JPL researchers have used pressure-sintering to densify mineral mixtures simulating lunar anorthosites and basalts. They did not quote actual compressive strengths achieved. NASA researchers found that sintering ilmenite powder at about 1000° C. with no applied pressure resulted visually in strong, compacted pellets.

We have noted several reasons why spent, reduced ilmenite (Fe+TiO$_2$) from the above described oxygen-making process is a preferred feed material to a sintering process: it has already been through mining, sizing and beneficiation steps; it has a higher density and a greater proportion of higher atomic number elements (Fe, Ti vs. Si, Al, Ca, Mg) than other, more abundant but Fe- and Ti-poor lunar minerals; and it is withdrawn hot from the oxygen process which saves energy in the downstream sintering step.

In the manufacture of construction materials, spent feed, i.e., reduced ilmenite and reduced lunar agglutinates, still having a particle size of 20-200 microns is removed from reactor R. The spent reactor feed is still at a temperature of about 300°-600° C., after preheating hydrogen in the bottom bed.

The particulate spent reactor feed is formed into bricks and heated to a temperature of 1,100°-1,500° C. The bricks are pressed, preferably by hot isostatic pressing, to pressures in the range from 3,000-30,000 psi while being sintered at the temperature of 1,100°-1,500°

C. for up to about two hours, preferably in an inert atmosphere, such as argon or in the lunar vacuum.

After cooling, the glassy bricks which are produced have sufficient strength for a variety of construction applications. Also, the bricks, because of their high content of heavier metals, are especially useful as shielding against cosmic radiation and other hazardous radiation, e.g., solar-wind derived proton flux, encountered under lunar or high orbital conditions.

While this invention has been described with special emphasis on certain preferred embodiments, it should be understood that, within the scope of the appended claims, this invention may be practiced otherwise than as specifically described herein.

We claim:

1. A process for producing structural, radiation-shielding construction blocks or bricks which comprises
   providing a feed material comprising a particulate material consisting essentially of a mixture of chemically reduced lunar ilmenite and lunar agglutinates having a particle size in the range from 20–200 microns produced by hydrogen reduction in a fine particulate state,
   compacting said feed material into a shape and sintering to produce structural, radiation-shielding construction blocks or bricks.
2. A process according to claim 1 in which
   said feed material is compacted at a pressure of 3,000–30,000 psi. and sintered at a temperature of 1,100°–1,500° C.

* * * * *